United States Patent [19]

Gornall

[11] Patent Number: 4,611,691
[45] Date of Patent: Sep. 16, 1986

[54] HYDRAULIC ACTUATOR ASSEMBLIES FOR VEHICLE BRAKES

[75] Inventor: Graham J. Gornall, West Midlands, England

[73] Assignee: Lucas Industries Public Limited Company, United Kingdom

[21] Appl. No.: 662,374

[22] Filed: Oct. 18, 1984

[30] Foreign Application Priority Data

Oct. 19, 1983 [GB] United Kingdom ............... 8327967
Mar. 7, 1984 [GB] United Kingdom ............... 8405902

[51] Int. Cl.$^4$ ............................................. F16D 55/02
[52] U.S. Cl. ........................... 188/71.8; 188/79.5 GE
[58] Field of Search ................. 188/79.5 S, 79.5 GE, 188/79.5 GC, 79.5 P, 79.5 SS, 79.5 R, 79.5 K, 325, 196 A, 196 B, 196 C, 71.4, 71.8, 196 BA; 192/111 A

[56] References Cited

U.S. PATENT DOCUMENTS

| | | | |
|---|---|---|---|
| 2,526,149 | 10/1950 | Myers et al. | 188/71.8 X |
| 2,741,338 | 4/1956 | Taylor | 188/196 B |
| 3,312,311 | 4/1967 | Dixon | 188/79.5 GE |
| 3,459,282 | 8/1969 | Hoenick et al. | 188/196 B X |
| 3,566,996 | 3/1971 | Crossman | 188/71.8 X |
| 3,952,845 | 4/1976 | Asquith | 188/196 D |
| 4,159,754 | 7/1979 | Airheart et al. | 188/71.8 |
| 4,383,593 | 5/1983 | Micke | 188/71.4 |

Primary Examiner—Bruce H. Stoner, Jr.
Assistant Examiner—Robert J. Oberleitner
Attorney, Agent, or Firm—Oldham, Oldham & Weber Co.

[57] ABSTRACT

An hydraulic actuator comprising a pair of oppositely acting hydraulic pistons working in a bore incorporates an automatic slack adjuster assembly which is housed in aligned bores in the pistons and acts as a strut to determine the relative retracted positions of the pistons. The adjuster assembly comprises a clamp member movable with the piston, and an adjuster member, the members including interengaging parts which co-operate with each other to form a releasable detent, in combination with a spring ring for biassing the interengaging parts into engagement, and the piston and the clamp member are provided with interengaging inclined faces to provide a wedge action and enhance the engagement of the interengaging parts when the bore is pressurized, and a stop loaded by a spring is provided in the bore with which the adjuster member is adapted to co-operate when movement of that member in a brake-applying direction exceeds a distance sufficient to take up the braking clearances. Additional movement of the clamp member in the same direction is operative to increase the effective length of the strut with the detent released until the force of the engagement of the interengaging parts at a predetermined point exceeds the force of the spring. The detent is re-engaged to prevent further relative axial movement between the two members whereafter, further movement of the strut with the piston is accommodated by movement of the stop against the loading in the spring.

11 Claims, 5 Drawing Figures

HYDRAULIC ACTUATOR ASSEMBLIES FOR VEHICLE BRAKES

This invention relates to hydraulic actuator assemblies for vehicle brakes of the kind in which a piston working in a bore in a housing is movable in the bore in response to hydraulic pressure to generate a brake-applying force.

Hydraulic actuator assemblies of the kind set forth may incorporate, or otherwise be associated with, slack adjusters which determine the retracted position of the piston in a retracted, "brakes-off" position in order, in turn, to determine the braking clearances. It is a problem to arrange that such adjusters do not respond to deflections of components of the brake when the brake is applied, otherwise there may be a tendency for the slack adjuster to "over adjust" and excessive braking clearances may have to be provided to compensate for such "over adjustment".

According to our invention in an hydraulic actuator assembly of the kind set forth incorporating an assembly which acts on a strut to determine the retracted position of the piston, the assembly comprises a first clamp member movable with the piston, and an adjuster member, the members including interengaging parts which co-operate with each other to form a releasable detent, in combination with resilient means which acts between the piston and the clamp member normally to bias the interengaging parts into engagement, and the piston and the clamp member are provided with interengaging inclined faces so constructed and arranged that axial movement of the clamp member with respect to the piston in an outward brake-applying direction in response to hydraulic brake-applying pressure in the bore enhances the engagement of the interengaging parts, and a spring-loaded stop is provided in the bore with which the adjuster member is adapted to co-operate when movement of that member in a brake-applying direction exceeds a distance sufficient to take up the braking clearances, additional movement of the clamp member in the same direction causing the clamp member to move axially with respect to the adjuster member to increase the effective length of the strut and define an adjusted retracted position for the piston when the brake pressure is relieved with the detent released against the force of the resilient means until the force of the engagement of the interengaging parts at a predetermined point exceeds the force of the spring-loaded stop, whereby to re-engage the detent and prevent further relative axial movement between the two members whereafter further movement of the strut with the piston is accommodated by movement of the stop against its spring loading.

The said predetermined point is chosen as the point at which the brake is fully applied and beyond which components of the brake begin to deflect.

Our adjuster is therefore said to be load-insensitive since it will adjust only as a result of excessive piston movement due to wear of the brake linings and not in response to excessive piston movement due to deflection of components of the brake after the brake has been fully applied.

The clamp member is housed in a bore in the piston and includes a piston part working in the bore and a plurality of angularly spaced integral resilient fingers which project towards the open end of the bore and carry at their free ends pawls for engagement with axially spaced teeth on the adjuster member, the pawls together being provided with the inclined face for engagement with the inclined face on the piston.

When the actuator comprises a pair of oppositely acting pistons working in the bore in the housing, the spring-loaded stop is housed within a bore in the second piston into which the adjuster member projects, and the free end of the adjuster member carries a head of which the outer end is engageable with a face at the inner end of the bore to define a stop determining the relative retracted position of the two pistons, the inner end of the head being adapted to abut against the spring-loaded stop.

The spring-loaded stop comprises a compression spring which is retained in a partially compressed caged condition by means of a cage, and a radial flange at the inner end of the cage forms an abutment for engagement by the head of the adjuster member when the actuator is operated.

Some embodiments of our invention is illustrated in the accompanying drawings in which.

Figure 1:
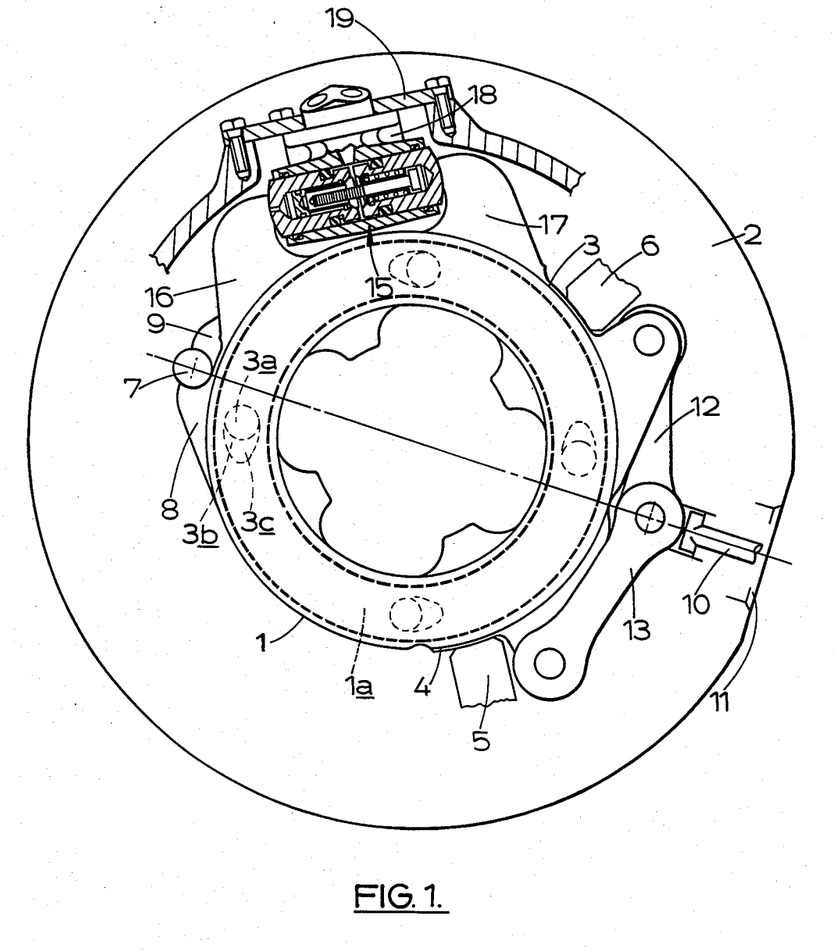
FIG. 1 is an end view of a brake of the spreading type.
Figure 2:
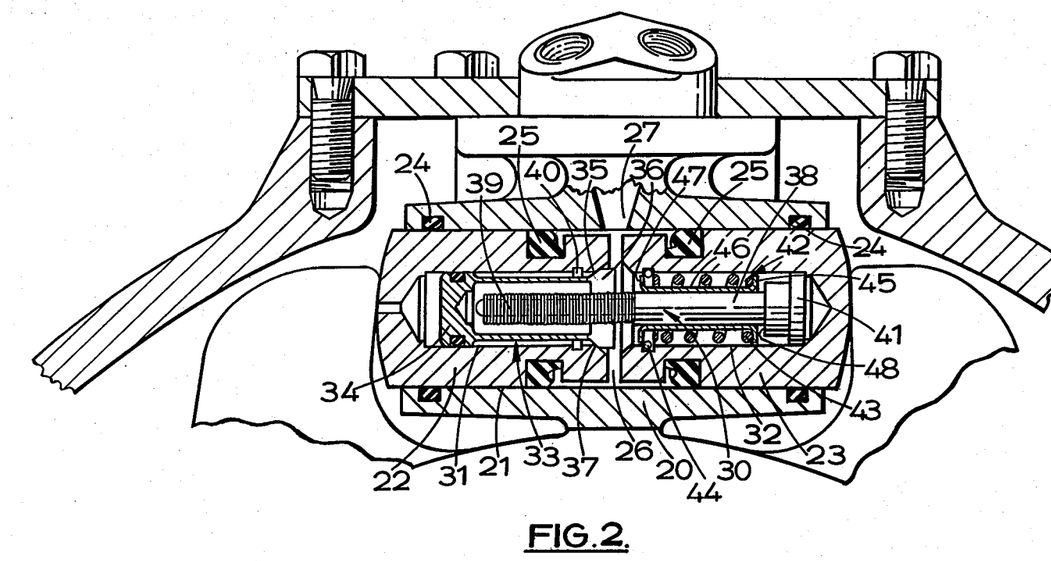
FIG. 2 is a longitudinal section on an enlarged scale of an hydraulic actuator assembly for the brake of FIG. 1.

The brake illustrated in FIGS. 1 and 2 of the drawings is of a conventional spreading type in which rotatable friction discs 1 provided with friction linings 1a are adapted to be brought into engagement with spaced opposed radial surfaces in a housing 2 by pressure plates 3, 4 located between the discs 1 and centred by stationary pilots 5, 6, 7. Balls 3a are located in co-operating oppositely inclined recesses 3b in the adjacent faces of the pressure plates 3, 4.

The application of the brake is initiated by moving the pressure plates 3, 4 angularly in opposite directions which causes the pressure plates to move axially relatively away from each other due to the tendency for the balls 3a to ride up ramps 3c defined by the end faces of the recesses 3b. This urges the friction discs into engagement with the faces in the housing 2. The pressure plates 3, 4 are then carried round with the discs until one is arrested by the engagement of a lug 8, 9 on a respective plate 3, 4 whereafter continued angular movement of the other plate provides a servo action.

The brake is applied mechanically for parking or in an emergency by a pull-rod 10 which extends through a radial opening 11 in the housing 2 and is coupled to the outer ends of a pair of toggle links 12, 13 of which the inner ends are pivotally connected to respective pressure plates 3, 4.

For normal surface braking the brake is applied hydraulically by a hydraulic actuator 15 which acts between lugs 16 and 17 on the pressure plates. The lugs 16 and 17 are displaced angularly from the toggle links 12 and 13, and the actuator is accessible through a second radial opening 18 in the housing 2 which is closed by a removable plate 19.

The actuator 15 comprises a cylinder 20 having an open-ended longitudinal through-bore 21 in which works a pair of oppositely acting pistons 22, 23 for engagement with the lugs 16 and 17. Each piston 22, 23 works through a seal 24 adjacent to the adjacent outer end of the housing 20 and carries a seal 25 adjacent to its inner end. A pressure space 26 defined in bore 21 between adjacent inner ends of the pistons 22 and 23 is connected to a master cylinder through a passage 27 in the housing 2 which is accessible from outside the housing.

An automatic slack adjuster assembly 30 is housed in the actuator 15, being accommodated in opposed axial bores 31, 32 in the pistons 22 and 23 respectively.

The adjuster assembly comprises a clamp member 33 which is housed in the bore 31 and comprises a piston part 34 working in the bore, a plurality of axially extending resilient fingers which project from the open end of the bore and carry formations 35 of which the inner edges are inclined for wedging engagement with a complementary, inclined, face 37 on the piston 22 and the inner edges comprise pawls 36. An adjuster member 38 extends through the clamp member 33 into the bore 32 and is provided with a plurality of axially spaced teeth 39 with which the pawls 36 are adapted to engage by the resilience in a spring ring 40 carried by the piston 22. The free end of the adjuster member 38 carries an enlarged head 41 of which the outer end engages with a face at the inner end of the bore 32 to limit the separation between the inner ends of the piston 22, 23. The clamp member 33 and the adjuster member 38 thus act as a strut to determine the retracted position in the off position of the brake, thereby determining the braking clearances.

A spring-loaded stop 42 is housed in the bore 32. The stop 42 comprises a caged compression spring 43 which abuts at opposite ends between a circlip 44 in the bore 32 and a flange 45 at the inner end of a cylindrical cage 46 of which a flange 47 at the opposite end engages with the circlip 44.

Normally an abutment face 48 defined by the inner end of the head 41 is spaced from the flange 45 by a distance equivalent to the braking clearances, and the pistons 22 and 23 are held in the retracted position by the return springs for the pressure plates 3 and 4.

When the brake is applied hydraulically pressure fluid in the pressure space 26 urges the pistons 22, 23 in opposite directions to urge the lugs 16 and 17 relatively away from each other as described above. During this movement of the pistons 22 and 23 the head 41 moves relatively towards the flange 45 as the braking clearances are taken up and contacts the flange 45 when the brake is fully applied with the pressure acting also on the piston part 34 to urge the formations 35 axially. Due to the wedge action, this enhances the grip of a detent defined by the engagement of the pawls 36 with the teeth 39.

If the movement of the head 41 relative to the flange 45 is excessive when the actuator is operated, indicating that adjustment for wear of the linings is required, then the adjuster member 38 is withdrawn through the clamp member 33 against the resilience of the ring 40 to increase the effective length of the strut. This continues until the load on the detent due to the pressure acting on the clamp member 33 exceeds the force in the spring 43, and any further relative movement between the pistons 22 and 23 is accommodated by compression of the spring 43.

The point at which the detent locks to prevent further extension of the strut is chosen as the point at which the brake is fully applied and before any force developed by the braking pressure can be utilised to cause deflection of the components of the brake.

When the brake is released, the pistons 22, 23 are returned to an inoperative, retracted position, of which the inner ends are spaced apart by a greater distance, as determined by the increased length of the strut.

To restore a fully extended strut to an initial position, the teeth 39 are separated by angularly spaced axial recesses with which the pawls 36 can register by moving the pistons 22, 23 angularly through an appropriate distance, whereafter the clamp member 33 and the adjuster member 38 can be moved towards each other with no resistance.

In a modified embodiment the pawl and the teeth may be replaced by a screw-threaded formation.

Figure 5:
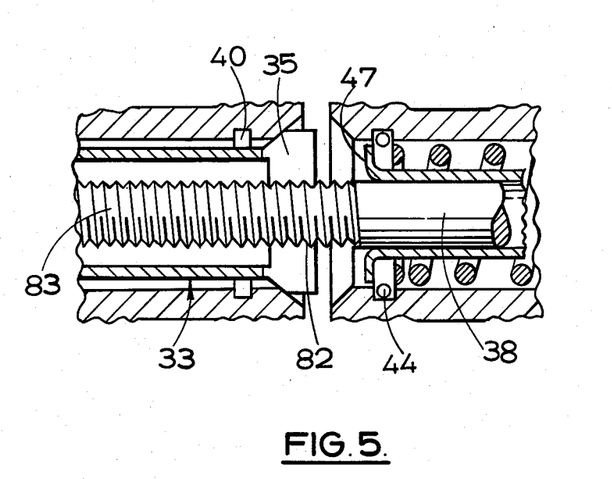
FIG. 5 is an enlarged section of a screw threaded engagement between the clamp member and the adjuster member of a hydraulic actuator assembly.

FIG. 5 shows such a modification. The modified adjuster assembly is similar to that described above, corresponding parts being given corresponding numerals. The engagement between the clamp member 33 and the adjuster member 38 is by means of a screw thread 82 provided on the adjuster member co-operating with a complementary screw thread 83 provided on the inner edges of formations 35 of the clamp member 33. The operation of the modified adjuster of FIG. 5 is as previously described for the adjuster of FIGS. 1 and 2.

The actuator and adjuster assembly described above can be used in a drum brake. For example it can be used with brakes of the two-leading shoe, or one-leading one-trailing shoe, or the duo-servo type. When the brake is of the duo-servo type, or acts in one mode as a brake of the duo-servo type, the strut is suffiently strong to transmit thrust from the primary shoe to the secondary shoe when the brake is applied.

Figure 3:
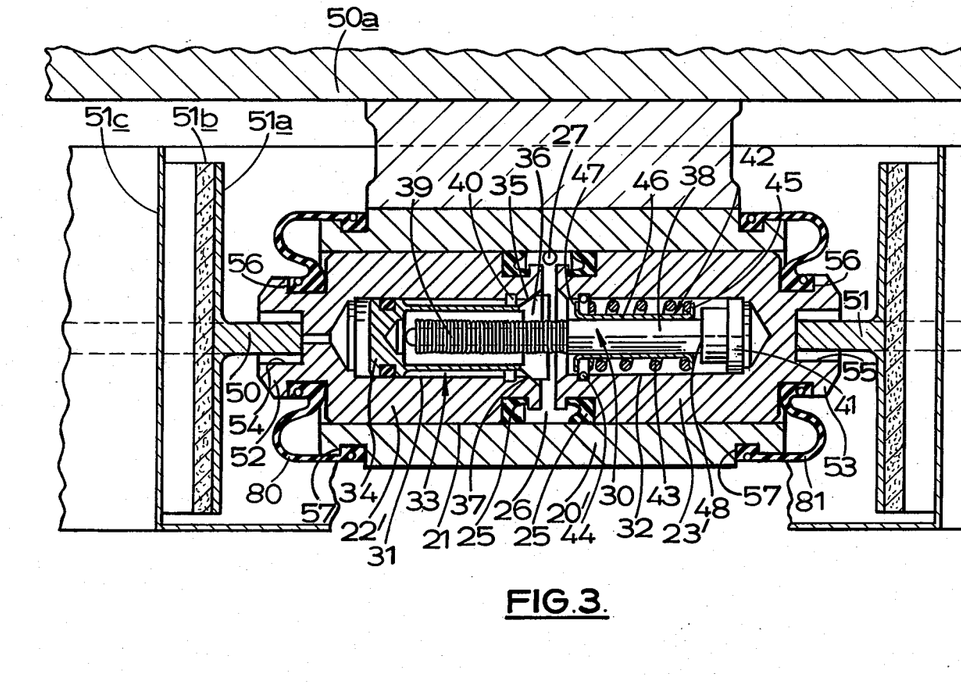
FIG. 3 is a horizontal section showing the actuator assembly incorporated in an internal shoe-drum drake.

As illustrated in FIG. 3 the actuator and adjuster assembly is incorporated in a vehicle internal shoe-drum brake. The cylinder 20' is mounted on a backing or torque plate 50a of the brake between adjacent shoe-ends 50, 51, and the outer ends of the pistons 22', 23' are extended outwardly to form bosses 52, 53. Notches 54, 55 are provided in the outer ends of the bosses 52 and 53 in which respective shoe-ends 50, 51 are received.

Actuation of the brake causes arcuate shoes 51a provided with friction linings 51b to move into frictional engagement with rotatable drum 51c and so brake the rotation of the drum.

The seals 25 are located closely adjacent to the inner ends of the two pistons 22' and 23', and the seals 24 are omitted. Annular sealing boots 80 and 81 are provided at opposite ends of the cylinder 20' and inner and outer thickenings or beads on each boot are received in respective radial groove 56, 57 in the boss 52, 53 and the adjacent end of the cylinder 20'.

The construction and operation of the actuator and adjuster is otherwise the same as that described above with reference to FIGS. 1 and 2, and corresponding reference numerals have been applied to corresponding parts.

The actuator and adjuster assembly described above can also be used in a vehicle disc brake and, in particular, in the actuator for a disc brake of the sliding sided caliper type in which opposed pistons located in a stationary housing and between a friction pad, and an axially movable clamping member, such as a yoke, for applying a second friction pad to the opposite face of a disc.

Figure 4:
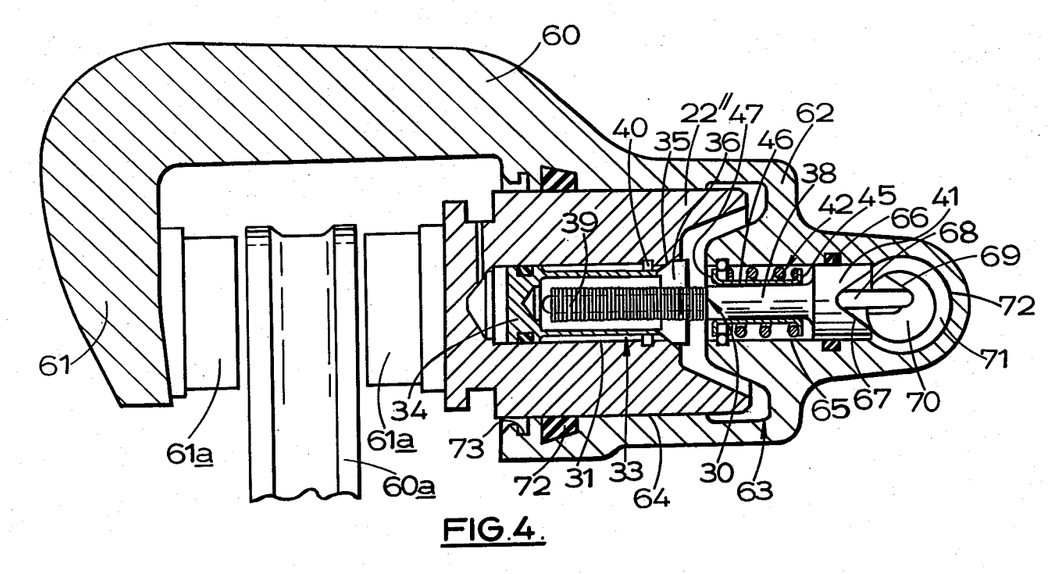
FIG. 4 is a longitudinal section through a vehicle disc brake.

In another construction illustrated in FIG. 4 of the drawings the actuator and adjuster assembly is incorporated in a vehicle disc brake of the side-sided, axially movable, caliper type.

The brake comprises a stationary drag-taking member of substantially U-shaped outline (not shown) which straddles the peripheral edge of a rotatable disc 60a. Opposed friction pad assemblies provided with friction pads 61a for engagement with opposite faces of the disc are mounted in the drag-taking member in which they are guided for movement towards and away from the disc guiding surfaces which take the drag on the pad assemblies when the brake is applied.

A caliper 60 having opposed limbs 61 and 62 straddles the disc and the friction pad assemblies and is guided for axial sliding movement on the drag-taking member, conveniently on circumferentially spaced guiding surfaces which may be constituted by guide pins.

The actuator and adjuster assembly is incorporated in the limb 62 which is provided with an axial bore 63 of stepped outline. The piston 22" is adapted to work in an inner portion 64 of the bore 63 which is of greater diameter. By comparison with the embodiment of FIG. 2, piston 23 is omitted and the bore 32 of the embodiment shown in FIG. 2 is constituted by an outer portion 65 of the bore 63 which is of smaller diameter. The head 41 is adapted to slide through a seal 66 in the wall of the bore 65, and the outer end of the head 41 is provided with conical recess 67 which receives one end of a rocking dolly or strut 68 of which the other end is received in a notch 69 in a brake-applying shaft 70. The shaft 70 is journalled for rotation in a bushing 71 housed in a transverse bore 72 in the limb 62.

The piston 22 slides through a seal 72 in the wall of the bore portion 64, and a resilient sealing boot, similar to the boot 26, may be connected between the piston 22 and a retaining groove 73 at the inner end of the bore 63.

The construction and operation of the actuator and adjuster is otherwise the same as that described above with reference to FIGS. 1 and 2, and corresponding reference numerals have been applied to corresponding parts.

I claim:

1. A hydraulic actuator assembly comprising a housing having a bore, a piston working in said bore and movable between a retracted position and an advanced brake-applying position, means for applying hydraulic brake-applying pressure to said piston in said bore to generate a brake-applying force, an adjuster assembly for determining said retracted position of said piston and braking clearances, and a strut through which said adjuster assembly acts on said piston, wherein said adjuster assembly comprises a first clamp member movable with said piston, an adjuster member, a first part on said first clamp member, and a second part on said adjuster member, said first and second parts being movable into engagement with each other to form a releasable detent, a resilient means acting between said piston and said clamp member normally to bias said first part and said second part into said engagement, a first inclined face on said piston, a second inclined face on said clamp member complementary to said first inclined face and engageable therewith, said inclined faces being so constructed and arranged that axial movement of said clamp member with respect to said piston in an outward brake-applying direction in response to said hydraulic brake-applying pressure in said bore enhances said engagement of first and second parts, a stop provided in said bore and with which said adjuster member is adapted to co-operate when movement of said adjuster member in a brake-applying direction exceeds a distance sufficient to take up said braking clearances, and a spring loading said stop, additional movement of said clamp member in the said brake-applying direction causing said clamp member to move axially with respect to said adjuster member to increase the effective length of said strut and define an adjusted retracted position for said piston with said detent released against said bias of said resilient means until the said force of said engagement of said interengaging parts at a predetermined point exceeds the force of said spring-loaded stop, whereby to re-engage said detent and prevent further relative axial movement between said adjuster member and said clamp member whereafter further movement of said strut with said piston is accommodated by movement of said stop against said loading in said spring, said adjusted retracted position defining a position to which said piston can retract when said brake pressure is relieved and which determines said braking clearances, no relative movement between said clamp member and said adjuster member taking place when said brake pressure is so relieved.

2. An actuator assembly as claimed in claim 1 wherein said piston forms the housing to define a second, stopped, bore having an open end, said clamp member being housed within said second bore and comprising a piston part, a plurality of angularly spaced integral resilient fingers and pawls, said piston part working in said second bore and said resilient fingers project towards the open end of said second bore and carry at their free ends said pawls for engagement with axially spaced teeth provided on said adjuster member, said pawls together being provided with said second inclined face for engagement with said first inclined face on said piston.

3. An actuator assembly as claimed in claim 1 wherein said piston forms a housing to define a second bore, said clamp member being housed within said second bore and includes a piston part and a screw threaded means of engagement between said clamp member and said adjuster member, said piston part being provided with said inclined face for engagement with said inclined face on said piston.

4. An actuator assembly as claimed in claim 1, wherein said actuator comprises said piston and a second oppositely acting piston to form a pair of oppositely acting pistons working in said bore in said housing, said housing defining a face at an inner end of said bore, a second bore defined by said second piston, said spring-loaded stop is housed within said second bore, said adjuster member projecting into said second bore, a head carried on the free end of the adjuster member said head having an outer end and an inner end, said outer end being engageable with said face at the inner end of said bore to define a stop determining the relative retracted position of said two pistons and breaking clearances, and said inner end of said head being adapted to abut against said spring-loaded stop.

5. An actuator assembly as claimed in claim 1 wherein said spring-loaded stop comprises a compression spring, a cage and a radial flange at the inner end of the cage, said spring is retained in a partially caged condition by means of said cage, said flange forms an abutment for engagement by said head of said adjuster member when the actuator is operated.

6. A brake of the spreading type comprising a housing having spaced opposed radial surfaces, friction discs provided with friction linings, pressure plates equipped with lugs located between said discs, stationary pilots to centre said pressure plates, co-operating oppositely inclined recesses being provided in adjacent faces of said pressure plates, end faces of said recesses defining ramps and balls located in said recesses, said friction linings are brought into engagement with said radial surfaces by means of said pressure plates being adapted to move angularly in opposite directions which causes them to move axially away from each other due to the tendency for said balls to ride up said ramps in said recesses, angular movement of said pressure plates in opposite directions being initiated by an actuator assembly acting between said lugs on said pressure plates, said actuator assembly comprising a housing having a bore, a piston working in said bore and movable between a retracted position and an advanced brake-applying position, means for applying hydraulic brake-applying pressure to said piston in said bore to generate a brake-applying force, an adjuster assembly for determining said retracted position of said piston and braking clearances, and a strut through which said adjuster assembly acts on said piston, wherein said adjuster assembly comprises a first clamp member movable with said piston, an adjuster member, a first part on said first clamp member, and a second part on said adjuster member, said first and second parts being movable into engagement with each other to form a releasable detent, a resilient means acting between said piston and said clamp member normally to bias said first part and said second part into said engagement, a first inclined face on said piston, a second inclined face on said clamp member complementary to said first inclined face and engageable therewith, said inclined faces being so constructed and arranged that axial movement of said clamp member with respect to said piston in an outward brake-applying direction in response to said hydraulic brake-applying pressure in said bore enhances said engagement of first and second parts, a stop provided in said bore and with which said adjuster member is adapted to co-operate when movement of said adjuster member in a brake-applying direction exceeds a distance sufficient to take up said braking clearances, and a spring loading said stop, additional movement of said clamp member in the said brake-applying direction causing said clamp member to move axially with respect to said adjuster member to increase the effective length of said strut and define an adjusted retracted position for said piston with said detent released against said bias of said resilient means until the said force of said engagement of said interengaging parts at a predetermined point exceeds the force of said spring-loaded stop, whereby to re-engage said detent and prevent further relative axial movement between said adjuster member and said clamp member whereafter further movement of said strut with said piston is accommodated by movement of said stop against said loading in said spring, said adjusted retracted position defining a position to which said piston can retract when said brake pressure is relieved and which determines said braking clearances, no relative movement between said clamp member and said adjuster member taking place when said brake pressure is so relieved.

7. An internal shoe-drum brake for a vehicle wherein arcuate shoes carry friction linings for engagement with a rotatable drum, said arcuate shoes are mounted on a backing plate, and said shoes are adapted to be separated at adjacent ends to apply said brake by means of an hydraulic actuator assembly comprising a housing having a bore, a piston working in said bore and movable between a retracted position and an advanced brake-applying position, means for applying hydraulic brake-applying pressure to said piston in said bore to generate a brake-applying force, an adjuster assembly for determining said retracted position of said piston and braking clearances, and a strut through which said adjuster assembly acts on said piston, wherein said adjuster assembly comprises a first clamp member movable with said piston, an adjuster member, a first part on said first clamp member, and a second part on said adjuster member, said first and second parts being movable into engagement with each other to form a releasable detent, a resilient means acting between said piston and said clamp member normally to bias said first part and said second part into said engagement, a first inclined face on said piston, a second inclined face on said clamp member complementary to said first inclined face and engageable therewith, said inclined faces being so constructed and arranged that axial movement of said clamp member with respect to said piston in an outward brake-applying direction in response to said hydraulic brake-applying pressure in said bore enhances said engagement of first and second parts, a stop provided in said bore and with which said adjuster member is adapted to co-operate when movement of said adjuster member in a brake-applying direction exceeds a distance sufficient to take up said braking clearances, and a spring loading said stop, additional movement of said clamp member in the said brake-applying direction causing said clamp member to move axially with respect to said adjuster member to increase the effective length of said strut and define an adjusted retracted position for said piston with said detent released against said bias of said resilient means until the said force of said engagement of said interengaging parts at a predetermined point exceeds the force of said spring-loaded stop, whereby to re-engage said detent and prevent further relative axial movement between said adjuster member and said clamp member whereafter further movement of said strut with said piston is accommodated by movement of said stop against said loading in said spring, said adjusted retracted position defining a position to which said piston can retract when said brake pressure is relieved and which determines said braking clearances, no relative movement between said clamp member and said adjuster member taking place when said brake pressure is so relieved.

8. A brake as claimed in claim 7, wherein said housing is mounted on said backing plate, also comprising a bore defined by the housing in which work a pair of oppositely acting pistons, said pistons are provided at their outer ends with bosses including notches in which respective shoe-ends are received.

9. A disc brake for a vehicle wherein friction pads for engagement with opposite faces at a rotatable disc are located in a caliper which straddles said disc and at least one of said friction pads is applied directly to said disc by means of an hydraulic actuator assembly comprising a housing having a bore, a piston working in said bore and movable between a retracted position and an advanced brake-applying position, means for applying hydraulic brake-applying pressure to said piston in said bore to generate a brake-applying force, an adjuster assembly for determining said retracted position of said piston and braking clearances, and a strut through which said adjuster assembly acts on said piston, wherein said adjuster assembly comprises a first clamp member movable with said piston, an adjuster member, a first part on said first clamp member, and a second part on said adjuster member, said first and second parts being movable into engagement with each other to form a releasable detent, a resilient means acting between said piston and said clamp member normally to bias said first part and said second part into said engagement, a first inclined face on said piston, a second inclined face on said clamp member complementary to said first inclined face and engageable therewith, said inclined faces being so constructed and arranged that axial movement of said clamp member with respect to said piston in an outward brake-applying direction in response to said hydraulic brake-applying pressure in said bore enhances said engagement of first and second parts, a stop provided in said bore and with which said adjuster member is adapted to co-operate when movement of said adjuster member in a brake-applying direction exceeds a distance sufficient to take up said braking clearances, and a spring loading said stop, additional movement of said clamp member in the said brake-applying direction causing said clamp member to move axially with respect to said adjuster member to increase the effective length of said strut and define an adjusted retracted position for said piston with said detent released against said bias of said resilient means until the said force of said engagement of said interengaging parts at a predetermined point exceeds the force of said spring-loaded stop, whereby to re-engage said detent and prevent further relative axial movement between said adjuster member and said clamp member whereafter further movement of said strut with said piston is accommodated by movement of said stop against said loading in said spring, said adjusted retracted position defining a position to which said piston can retract when said brake pressure is relieved and which determines said braking clearances, no relative movement between said clamp member and said adjuster member taking place when said brake pressure is so relieved.

10. A disc brake as claimed in claim 9, wherein said caliper is slidably mounted for axial movement with respect to said disc, and said actuator acts between the said one friction pad and an adjacent limb of said caliper.

11. A disc brake as claimed in claim 9 wherein a single piston is adapted to act on the said one friction pad to apply the brake, said piston being worked by the said limb which forms part of said housing.

* * * * *